(12) United States Patent
Liu et al.

(10) Patent No.: US 12,277,035 B2
(45) Date of Patent: Apr. 15, 2025

(54) METHOD, ELECTRONIC DEVICE, AND COMPUTER PROGRAM PRODUCT FOR STORAGE PERFORMANCE EXPANSION

(71) Applicant: DELL PRODUCTS L.P., Round Rock, TX (US)

(72) Inventors: Bing Liu, Tianjin (CN); Cheng Wang, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 71 days.

(21) Appl. No.: 18/295,962

(22) Filed: Apr. 5, 2023

(65) Prior Publication Data

US 2024/0281343 A1   Aug. 22, 2024

(30) Foreign Application Priority Data

Feb. 17, 2023   (CN) .......................... 202310135289.7

(51) Int. Cl.
    *G06F 11/14*   (2006.01)
(52) U.S. Cl.
    CPC ...... *G06F 11/1466* (2013.01); *G06F 11/1461* (2013.01); *G06F 11/1469* (2013.01)
(58) Field of Classification Search
    CPC ............. G06F 11/1466; G06F 11/1461; G06F 11/1469
    USPC ......................................................... 714/6.3
    See application file for complete search history.

(56) References Cited

U.S. PATENT DOCUMENTS

| 8,095,764 B1 * | 1/2012 | Bauer ................... | G06F 3/0605 |
| | | | 711/170 |
| 2013/0318051 A1 * | 11/2013 | Kumar .................. | G06F 16/137 |
| | | | 707/692 |

* cited by examiner

*Primary Examiner* — Yair Leibovich
(74) *Attorney, Agent, or Firm* — WOMBLE BOND DICKINSON (US) LLP (57) ABSTRACT

Embodiments of the present disclosure provide a method, an electronic device, and a computer program product for storage performance expansion. The method includes acquiring, from a client, backup settings of a user for backing up data in a storage system and the user's priority. The method further includes determining, based on the user's priority, an input/output (I/O) specification of the storage system that is able to be allocated to the client. The method further includes determining, based on the backup settings, a time period in which a peak value of an I/O load of the storage system occurs. The method further includes increasing I/O performance of the storage system in response to that the peak value is greater than an upper limit of the I/O specification. The embodiments of the present disclosure can solve the I/O peak problem more effectively without interrupting a data backup or restoration service.

20 Claims, 7 Drawing Sheets

METHOD, ELECTRONIC DEVICE, AND COMPUTER PROGRAM PRODUCT FOR STORAGE PERFORMANCE EXPANSION

CROSS-REFERENCE TO RELATED APPLICATION

This patent application claims priority, under 35 U.S.C. § 119, of Chinese Patent Application No. 202310135289.7, filed Feb. 17, 2023, which is incorporated by reference in its entirety.

TECHNICAL FIELD

Embodiments of the present disclosure relate to the field of computers, and more particularly, to a method, an electronic device, and a computer program product for storage performance expansion.

BACKGROUND

For enterprises that need high-performance workloads or need to manage large files, block storage is an efficient and flexible cloud storage option. The block storage is a block-level storage with low latency, persistence, and high reliability provided for a cloud server. The block storage supports automatic copying of users' data in an available area, preventing data unavailability caused by unexpected hardware failure and protecting data from the threat of hardware failure. A block storage system may include various types of disks, and different disks are different in performance to meet needs of different users.

SUMMARY OF THE INVENTION

Embodiments of the present disclosure provide a method, an electronic device, and a computer program product for storage performance expansion.

According to a first aspect of the present disclosure, a method for storage performance expansion is provided. The method includes acquiring, from a client, backup settings of a user for backing up data in a storage system and the user's priority. The method further includes determining, based on the user's priority, an input/output (I/O) specification of the storage system that is able to be allocated to the client. The method further includes determining, based on the backup settings, a time period in which a peak value of an I/O load of the storage system occurs. The method further includes increasing I/O performance of the storage system in response to that the peak value is greater than an upper limit of the I/O specification.

According to a second aspect of the present disclosure, an electronic device is further provided. The electronic device includes a processor and a memory coupled to the processor, wherein the memory has instructions stored therein, and the instructions, when executed by the processor, cause the device to execute actions. The actions include acquiring, from a client, backup settings of a user for backing up data in a storage system and the user's priority. The actions further include determining, based on the user's priority, an input/output (I/O) specification of the storage system that is able to be allocated to the client. The actions further include determining, based on the backup settings, a time period in which a peak value of an I/O load of the storage system occurs. The actions further include increasing I/O performance of the storage system in response to that the peak value is greater than an upper limit of the I/O specification.

According to a third aspect of the present disclosure, a computer program product is provided. The computer program product is tangibly stored on a computer-readable medium and includes computer-executable instructions, wherein the computer-executable instructions, when executed by a device, cause the device to perform the method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope at all.

In the field of data storage, it often happens that the I/O load exceeds the upper limit of a block storage system because different clients execute backup tasks or restoration tasks at the same time. Because the I/O load exceeds the upper limit, an I/O throttling mechanism for data protection may be triggered, which will cause users to fail to finish backup tasks or restoration tasks within a scheduled time, and even cause service interruption.

In view of this, the present disclosure provides a method for storage performance expansion. The method can acquire backup settings of a user and the user's priority from a client, and determine how many I/O resources (I/O specification) are allocated to the client based on the backup settings and the user's priority. The I/O specification may be improved before a predicted peak value of an I/O load comes. After the peak value of the I/O load, the I/O specification may be reduced. In this way, I/O throttling and service interruption caused by the I/O throttling will not be triggered. Compared with upgrading a system configuration to a higher-end model, the user can cope with the I/O peak value by temporarily increasing the I/O capability of the disk in a data protection product and restoring to a baseline configuration after the I/O peak value, thereby saving the resource consumption of the user.

This can help the data protection product effectively handle the I/O peak value without affecting the system performance. Moreover, compared with re-configuring the data protection product to a higher-end model, customers consume fewer resources. In addition, data unavailability (DU) is further prevented, and therefore, the service will not be interrupted during the entire I/O peak value and the disk I/O expansion/reduction process.

Figure 1:
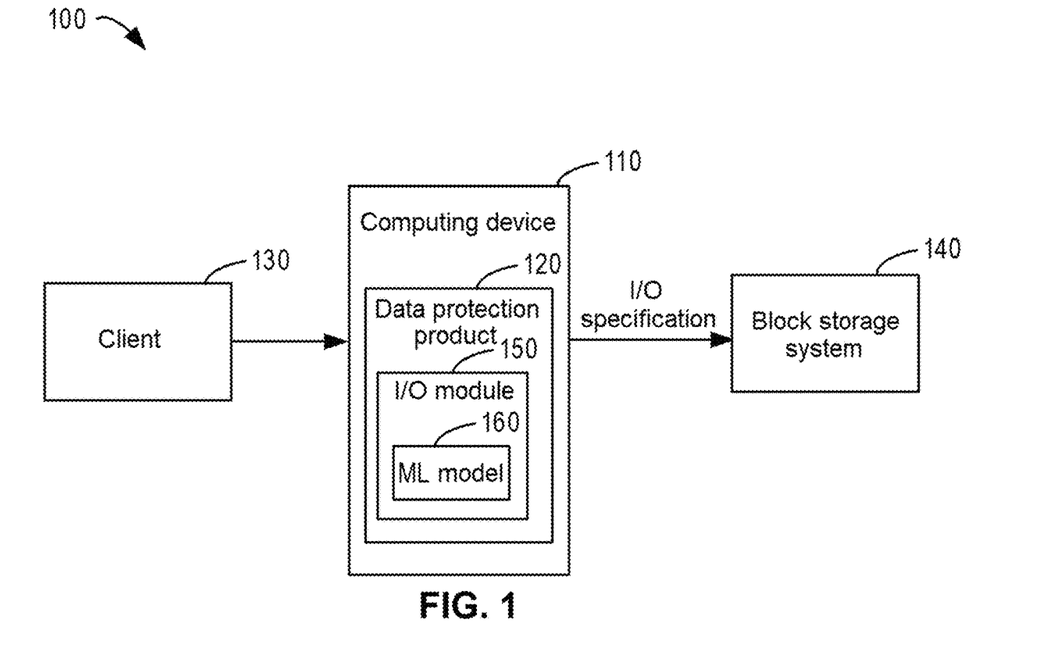
FIG. 1 shows a schematic diagram of an example environment in which embodiments of the present disclosure can be implemented.

FIG. 1 is a schematic diagram of example environment 100 in which embodiments of the present disclosure can be implemented. The present disclosure will take a block storage system as an example for description, and the present disclosure is also applicable to any storage system. The storage system can store deduplicated data of a user, including a Virtual Machine, a block storage, and an object storage. The block storage may be block storage, including a plurality of Block Disks, such as system disks and metadata disks. The present disclosure can improve the performance of block storage modules (including a plurality of block disks) in the system, thereby improving the IO processing capability of the entire system.

In environment 100, computing device 110 (e.g., a computing system or a server) has data protection product 120 installed thereon. Data protection product 120 is connected to block storage system 140. Environment 100 further includes client 130. A user performs a data backup task or a data restoration task through a user interface of client 130.

Data protection product 120 includes I/O module 150. I/O module 150 may monitor an I/O load of block storage system 140. I/O module 150 may analyze the real-time I/O load and calculate a change of the I/O load. The I/O load of block storage system 140 may be divided into several segments in time sequence. In some embodiments, I/O module 150 may decide, based on an I/O load analysis result, whether to expand or reduce the I/O performance of disks of block storage system 140 to adapt to a possible I/O peak value.

If I/O module 150 decides to expand or reduce the I/O performance of the disks in block storage system 140, an I/O capability may be determined based on the prediction result, and the I/O capability will meet needs of the future I/O peak value. I/O module 150 may send the I/O capability together with instructions to block storage system 140 to adjust the I/O performance of block storage system 140.

I/O module 150 may acquire historical operation data of block storage system 140. In some embodiments, the historical operation data may be directly from block storage system 140. In some embodiments, the historical operation data may be acquired from another storage device.

I/O module 150 includes machine learning model 160. Machine learning model 160 may analyze the historical operation data (for example, historical and runtime I/O loads of block storage system 140), and predict a future I/O load to determine when the I/O will arrive. Data protection product 120 may decide, based on the I/O load analysis result, whether to expand or reduce the I/O performance of the disks in block storage system 140 to adapt to the I/O peak value.

If data protection product 120 (I/O module 150) decides to expand or reduce the I/O performance of the disks in block storage system 140, the I/O capability may be determined based on the prediction result, and the I/O capability will meet the needs of the future I/O peak value. Data protection product 120 may send the I/O capability together with instructions to block storage system 140 to adjust the I/O performance of block storage system 140.

Figure 2:
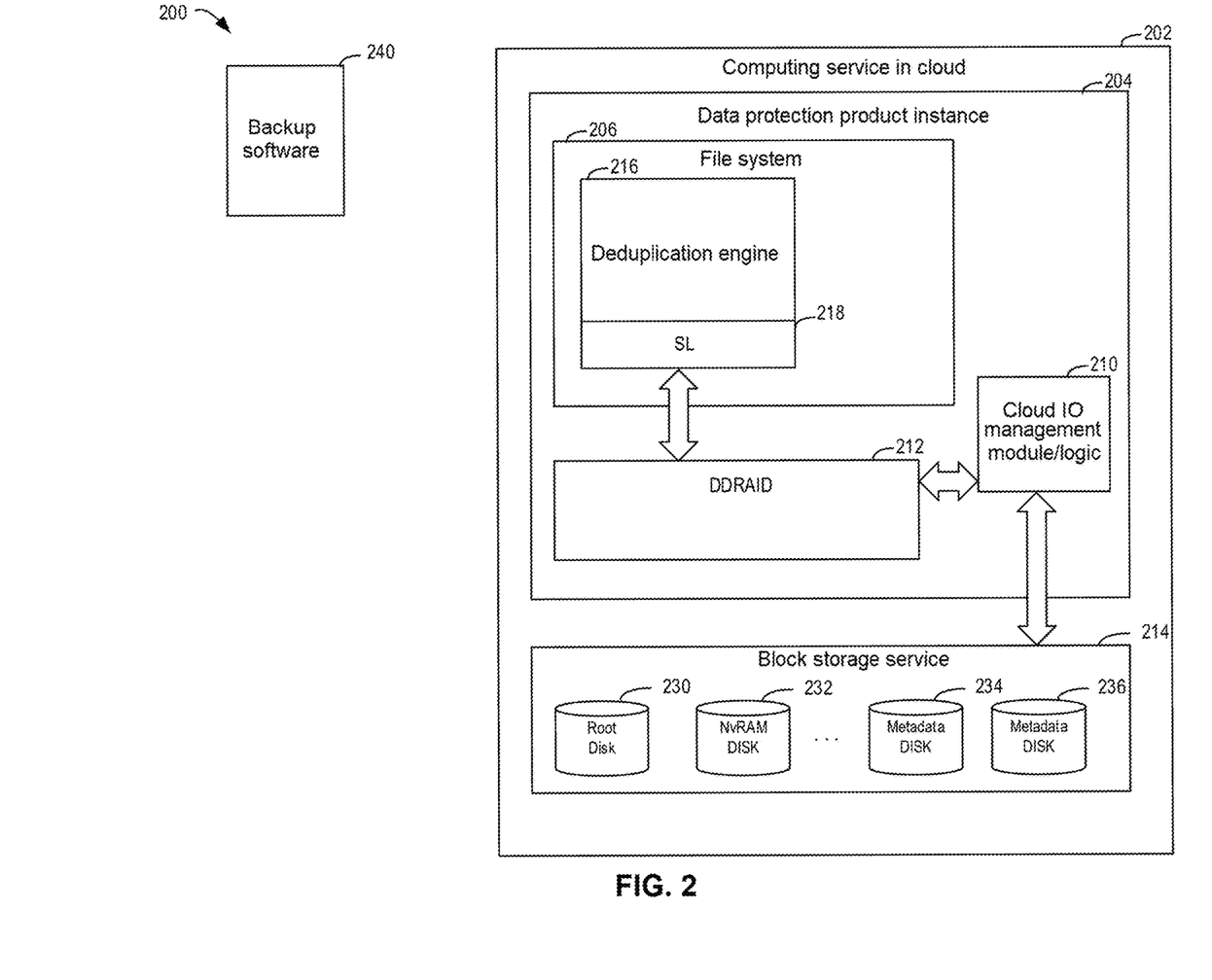
FIG. 2 schematically shows a schematic diagram of a product framework according to an example implementation of the present disclosure.

FIG. 2 schematically shows a schematic diagram of product framework 200 according to an example implementation of the present disclosure. As shown in FIG. 2, product framework 200 is included in backup software 240. In some embodiments, the data protection product may run in a virtual machine of backup software 240. Backup software 240 may further provide computing service 202. Computing service 202 includes data protection product instance 204. Data protection product instance 204 includes file system 206. File system 206 further includes deduplication engine 216. Deduplication engine 216 is used for analyzing and identifying whether data from a user is duplicate, and making the duplicate data into metadata. The deduplicated user data is saved to distributed data redundancy array of independent disks (DDRAID) 212 via storage layer (SL) 218.

As an example, block storage service 214 shows details of disk types of the block storage service, for example, root disk 230, Non-Volatile Random Access Memory (NvRAM) disk 232, metadata disk 234, and metadata disk 236.

In some embodiments, data protection product instance 204 may include cloud I/O management module/logic 210. Cloud I/O management module/logic 210 may be connected to DDRAID 212 and block storage service 214. Cloud I/O management module/logic 210 may be used for analyzing the I/O load of the block storage system, determining the I/O capability, and issuing instructions for adjusting the I/O performance.

Figure 3:
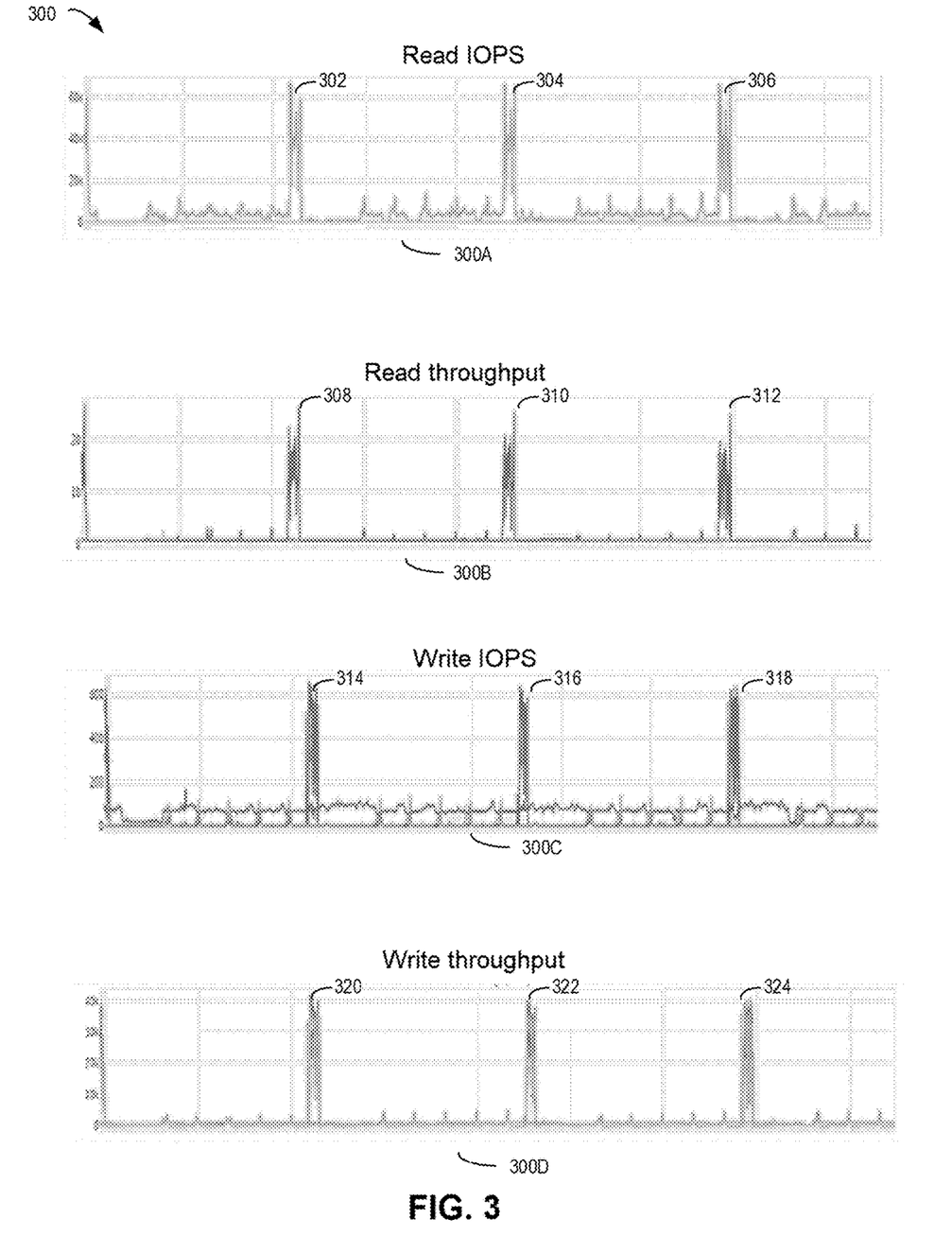
FIG. 3 schematically shows a schematic diagram of regular I/O statistical data according to an example implementation of the present disclosure.

FIG. 3 schematically shows a schematic diagram of regular I/O statistical data 300 according to an example implementation of the present disclosure. As can be seen from FIG. 3, characteristics of backup activities include large I/O loads on weekends and small I/O loads on weekdays.

Curve 300A shows a change of read input/output per second (READ IOPS) when a user backup task is executed. As shown in FIG. 300A, peak value 302, peak value 304, and peak value 306 are concentrated on the weekend of each week.

Curve 300B shows a change of READ THROUGHPUT when the user backup task is executed. As shown in FIG. 300B, peak value 308, peak value 310, and peak value 312 are concentrated on the weekend of each week consistent with curve 300A.

Curve 300C shows a change of write input/output per second (WRITE IOPS) when the user backup task is executed. As shown in FIG. 300C, peak value 314, peak value 316, and peak value 318 are concentrated on the weekend of each week consistent with curves 300A and 300B.

Curve 300D shows a change of WRITE THROUGHPUT when the user backup task is executed. As shown in FIG. 300D, rules of peak value 320, peak value 322, and peak value 324 are consistent with curves 300A, 300B, and 300C, which reflects that the user backup service occurs according to a plan.

Figure 4:
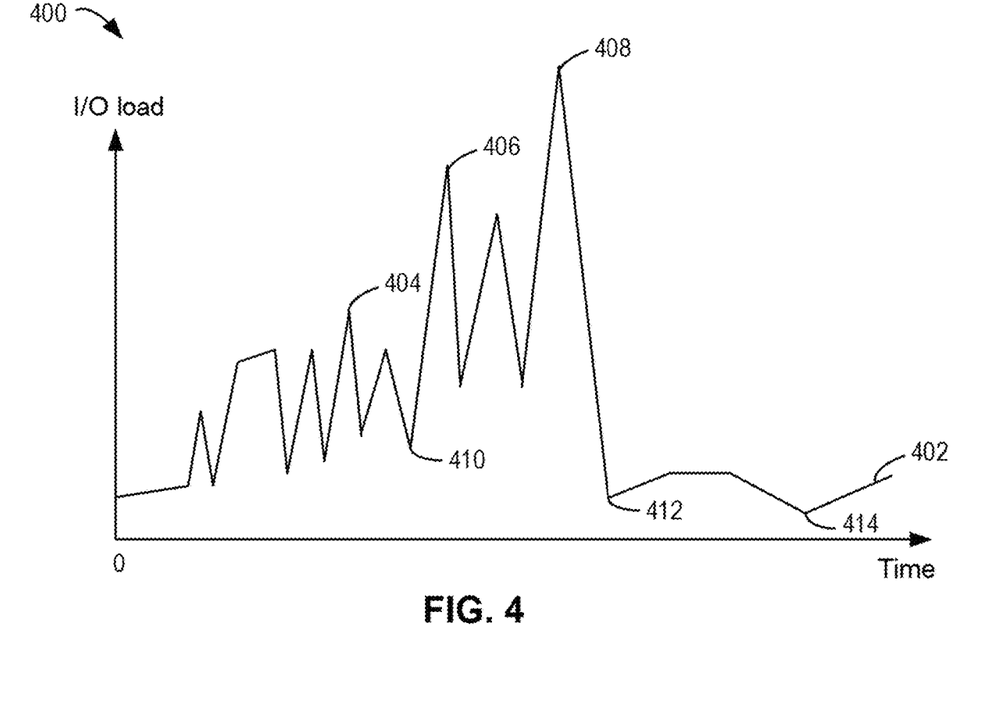
FIG. 4 schematically shows a schematic diagram of irregular I/O statistical data according to an example implementation of the present disclosure.

FIG. 4 schematically shows a schematic diagram of irregular I/O statistical data 400 according to an example implementation of the present disclosure. Some irregular I/O loads are also observed in the study. As shown in FIG. 4, peak value 404 and peak value 406 of the I/O load shown in curve 402 are local peak values, and the global peak value only appears at peak value 408 after several oscillations. When the I/O load is the lowest, for example at 410, 412, and 414, there are some troughs in stages. In general, for I/O loads with a shape similar to that of curve 402, it is difficult to predict a future I/O load based on historical I/O loads.

Therefore, in order to deal with regular and irregular backup tasks and restoration tasks, the method of the present disclosure provides a method for storage performance expansion. The method can acquire backup settings of a user and the user's priority from a client, and determine how many I/O resources (I/O specification) are allocated to the client based on the backup settings and the user's priority. In this way, the size and time of an I/O peak value may be determined accurately in advance, without triggering I/O throttling and service interruption caused by the I/O throttling. Compared with upgrading a system configuration to a higher-end model, the user can cope with the I/O peak value by temporarily increasing the I/O capability of the disk in a data protection product and restoring to a baseline configuration after the I/O peak value, thereby saving the resource consumption of the user.

Figure 5:
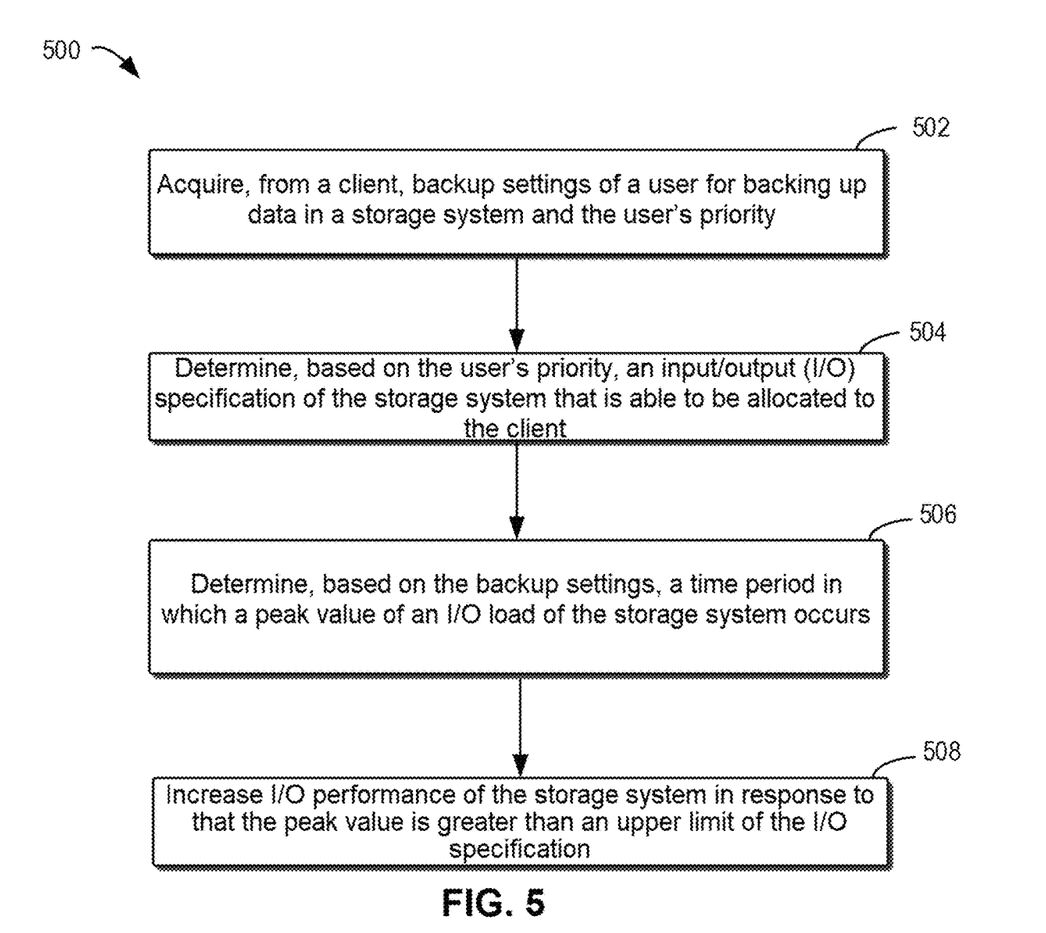
FIG. 5 schematically shows a flow chart of a method for storage performance expansion according to an example implementation of the present disclosure.

FIG. 5 schematically shows a flow chart of method 500 for storage performance expansion according to an example implementation of the present disclosure. Method 500 will be described below with reference to FIG. 1 and FIG. 5, and a block storage system will be used as an example.

At block 502, backup settings of a user for backing up data in a storage system and the user's priority are acquired from a client. At block 504, an input/output (I/O) specification of the storage system that is able to be allocated to the client is determined based on the user's priority. As an example, I/O module 150 receives backup settings from client 130. I/O module 150 receives restoration settings from client 130. I/O module 150 acquires the user's priority from client 130.

In some embodiments, the user's priority indicates a degree of importance of the user. The user's priority may be selected by the user. Different priorities will correspond to different I/O specifications. A high priority of a user indicates that more I/O resources may be occupied on the basis of a fixed overall I/O specification. A low priority of a user indicates that fewer I/O resources may be allocated on the basis of a fixed overall I/O specification. In some embodiments, the I/O specification may at least include one or both of IOPS and I/O throughput.

In some embodiments, a backup start time and backup content are planned in the backup settings, and therefore, data protection product 120 may estimate an I/O peak value and the time required for the backup task based on factors such as data size, bandwidth, and transmission speed.

In some embodiments, a restoration start time and restore content are planned in the restoration settings, and therefore, data protection product 120 may estimate an I/O peak value and the time required for the restoration task based on factors such as data size, bandwidth, and transmission speed. In some embodiments, a restoration task may indicate that a disk storing user data may be broken and the data user needs to be migrated to another disk. Alternatively, user data needs to be copied to another disk for security.

Figure 6:
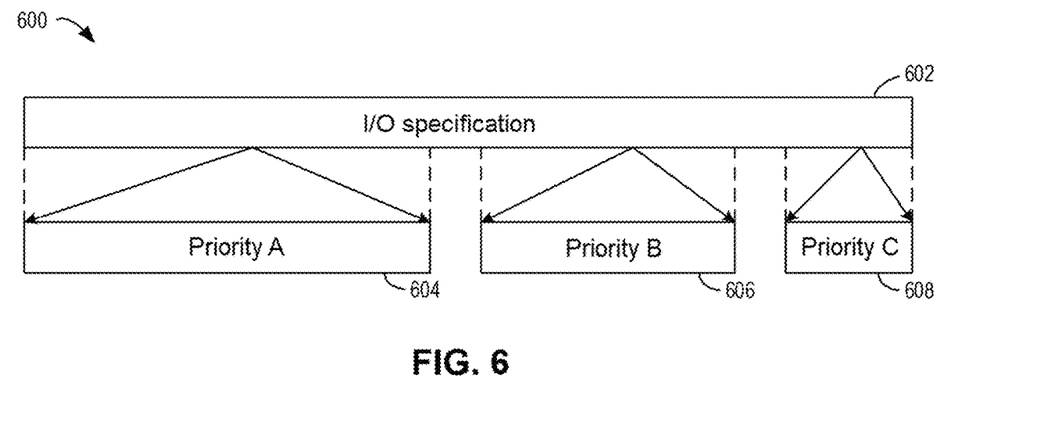
FIG. 6 schematically shows a schematic diagram of allocating an I/O specification according to an example implementation of the present disclosure.

Now referring to FIG. 6, FIG. 6 schematically shows a schematic diagram of allocating an I/O specification according to an example implementation of the present disclosure. As shown in FIG. 6, priority A has the highest level, priority B has a level lower than that of priority A, and priority C has a level lower than that of priority B. As a result, for overall I/O specification 602, the I/O resources are limited, and therefore, I/O specifications need to be allocated in combination with different priorities.

In some embodiments, it is assumed that there are three users in total. User A selects priority A. User B selects priority B, and user C selects priority C. Then, user A will be allocated with the maximum I/O specification, that is, I/O specification 604. User B will be allocated with I/O specification 606, that is, the medium I/O specification. User C will be allocated with the minimum I/O specification, that is, I/O specification 608. In this way, I/O resources can be allocated according to the priority level selected by a user, so that the allocation is fairer and is consistent with the resource consumptions of the user.

Now return to FIG. 5, at block 506, a time period in which a peak value of the I/O load of the storage system occurs is determined based on the backup settings. For example, the start time in the backup settings is 2:00 am, an expected end time is 5:00 am, the size of the backup content is 5 GB, the current I/O specification is IOPS being 3000, and the I/O throughput is 125 MiB/s. Then, the time required for the backup task may be calculated. If the calculated time is greater than 3 hours, it is likely that the backup task cannot be completed at 5:00 am. In this case, the I/O specification may be improved to meet the needs.

For another example, an I/O specification required to complete the backup plan at the predetermined backup time and an I/O peak value that may occur during the backup may be determined according to the backup settings. Assume that the I/O specification that is able to be allocated to the user accounts for 50% of the total I/O specification. Then, the I/O specification that the user may be allocated may be determined, that is, 50% is multiplied by the total I/O specification. More generally, it may be expressed by formula (1):

$$C = S * al \tag{1}$$

Where C represents the I/O capability, S represents the total I/O specification, and a1 represents the proportion of the I/O specification that is able to be allocated.

At block 508, in response to the peak value being greater than the upper limit of the IO specification, the I/O performance of the storage system is increased. As an example, if the I/O peak value in the time period determined at block 506 is greater than the I/O specification that is able to be allocated to client 130 determined at block 504, the I/O performance of block storage system 140 needs to be increased to meet the needs of the backup task.

In some embodiments, examples of the I/O specification may include disk types of block storage system 140 and performance parameters of corresponding disks. As an example, the I/O specification may include gp3, io2, and io1. The IOPS of a disk with a disk type of gp3 may change from 3000 (baseline) to 15000, and the I/O throughput may change from 125 MiB/s to 1000 MiB/s. The maximum IOPS of a disk with a disk type of io2 may be 64000, and the maximum I/O throughput may be 1000 MiB/s. The maximum IOPS of a disk with a disk type of io1 may be 64000, and the maximum I/O throughput may be 1000 MiB/s. Therefore, by taking a disk with a disk type of io1 as an example, the IOPS may be adjusted in a range from 3000 to 64000, and the throughput may be adjusted in a range from 125 MiB/s to 1000 MiB/s.

In some embodiments, after the time period, the I/O performance of block storage system 140 may be reduced based on the backup settings.

Implementing method 500 can help the data protection product effectively handle the I/O peak value without affecting the system performance. Compared with re-configuring the data protection product to a higher-end model, users' resource consumption is reduced. In addition, during the entire I/O peak value and the disk I/O expansion/reduction process, the service will not be interrupted, thereby improving the user experience. The backup device comes from the client, and the possible occurrence time and size of the I/O peak value may be determined more accurately, and therefore, it may be more prepared to adjust the I/O performance of the block storage system.

Figure 7:
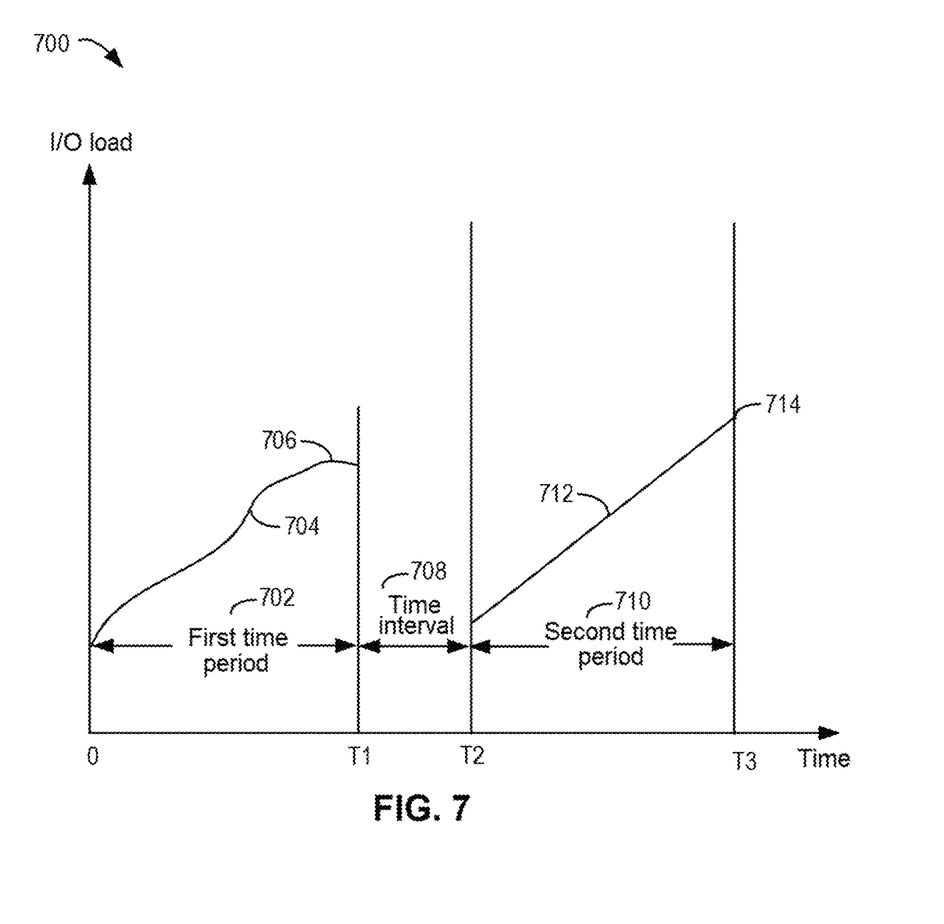
FIG. 7 schematically shows a schematic diagram of backup settings and restoration settings according to an example implementation of the present disclosure.

FIG. 7 schematically shows a schematic diagram of backup settings and restoration settings according to an example implementation of the present disclosure. As shown in FIG. 7, curve 704 shows an I/O load when a backup task is performed. Curve 712 shows an I/O load when a restoration task is performed. Since a user may set a backup task and a restoration task at adjacent times or even at the same time, the situation must be considered.

Curve 704 occurs in first time period 702 from 0 to T1, and curve 712 occurs in second time period 710 from T2 to T3. First time period 702 and second time period 710 may have time interval 708. In some embodiments, the length of time interval 708 may be larger than that as shown. In some embodiments, the length of time interval 708 may be zero. This means that there is no interval between first time period 702 and second time period 710.

In some embodiments, the length of time interval 708 may be negative. When the length of time interval 708 is negative, it means that first time period 702 and second time period 710 have an overlapping part, and the length of the overlapping part is the length of time interval 708.

In some embodiments, if the value of time interval 708 is relatively small, for example, less than a predetermined threshold, since it also takes time to adjust the I/O performance of block storage system 140, the current I/O performance of block storage system 140 may be kept unchanged.

As an example, if the value of time interval 708 is a, but the time for adjusting the I/O performance of block storage system 140 is c, and if values of a and c are very close, this reflects that the adjustment may not be completed before a peak value of the I/O load has arrived, then the current I/O performance may be maintained.

In some embodiments, if the value of time interval 708 is relatively large, for example, greater than a predetermined threshold, then the current I/O performance of block storage system 140 may be reduced in order to further reduce users' resource consumption. As an example, if the value of time interval 708 is a, the value of the predetermined threshold is b, if a is greater than b, this reflects that the adjustment can be completed, and the current I/O performance may be reduced in order to minimize the resource consumption of the user.

In some embodiments, if peak value 714 (also referred to as a second peak value) is greater than peak value 706 (also referred to as a first peak value), and time interval 708 is less than a predetermined threshold (also referred to as a first threshold), the I/O performance of block storage system 140 may be increased, for example, to a value of peak value 714. As an example, if the value of peak value 714 is d, the value of peak value 706 is e, the value of time interval 708 is a, and the value of the first threshold is b, if a is less than b, and d is greater than e, this reflects that the adjustment can be completed, and a peak value after the adjustment will be larger than the previous peak value. In order to meet the larger peak value after the adjustment, the current I/O performance may be increased.

In some embodiments, if peak value 714 is less than peak value 706, and time interval 708 is less than the predetermined threshold, the I/O performance of block storage system 140 may be reduced, for example, to the value of peak value 714. As an example, if the value of peak value 714 is d, the value of peak value 706 is e, the value of time interval 708 is a, and the value of the first threshold is b, If a is less than b, and d is less than e, this reflects that the adjustment can be completed, and the peak value after the adjustment will be smaller than the previous peak value. In order to minimize the users' resource consumption, the current I/O performance may be reduced to d.

In some embodiments, if time interval 708 is greater than the first threshold, a difference between peak value 706 and peak value 714 may be determined. If the difference is less than the second threshold, the I/O performance of block storage system 140 may be reduced. As an example, if the value of peak value 714 is d, the value of peak value 706 is e, the value of time interval 708 is a, the value of the first threshold is b, and the value of the second threshold is g, then difference f between d and e may be determined. If a is greater than b and f is less than g, this reflects that the adjustment can be completed, and the difference between peak value 714 and peak value 706 is small. The block storage system can meet the impact caused by the difference. In order to minimize the users' resource consumption, the current I/O performance may be reduced to the smaller one of peak value 714 and peak value 706.

In some embodiments, if the difference is greater than the second threshold and peak value 714 is greater than peak value 706, the current I/O performance of block storage system 140 may be maintained. As an example, if the value of peak value 714 is d, the value of peak value 706 is e, the value of time interval 708 is a, the value of the first threshold is b, and the value of the second threshold is g, then difference f between d and e may be determined. If a is greater than b and f is greater than g, this reflects that the adjustment can be completed, the difference between peak value 714 and peak value 706 is large, and the block storage system cannot meet the impact caused by the difference. In order to meet a larger peak value, the current I/O performance may be increased to meet the needs.

The advantage of this is that it is unnecessary to adjust the current I/O performance of block storage system 140 frequently, because adjusting block storage system 140 also requires a certain amount of time, which can avoid conflicts between instructions so that the system is more efficient and effective.

In some embodiments, I/O module 150 may monitor the I/O load of block storage system 140 in real time and determine the change of the I/O load of block storage system 140. When the change is large, such as exceeding a third threshold, it may be calculated that the peak value of the I/O load in a future time period may exceed the current I/O specification, and the system may have I/O throttling or even service interruption. In this way, the I/O performance of block storage system 140 may be increased based on the I/O specification, the future time period, and the change, so as to avoid the I/O throttling, that is, the I/O peak value may be prevented from exceeding the upper limit of the current I/O performance.

In some embodiments, when the backup settings or restoration settings are acquired, a complete time period of the backup task or restoration task may be known. A center of the time period is taken as the time when the peak value of the I/O load occurs, on the basis of which the length of the time period is determined.

In some embodiments, machine learning model 160 in I/O module 150 may be used for estimating the peak value of the I/O load. As an example, I/O module 150 may be trained through historical operation data, and therefore, it has the ability of predicting the size and time of the peak value of the I/O load.

In some embodiments, machine learning model 160 may be used for determining the I/O utilization of block storage system 140 in a future time period. As an example, machine learning model 160 may predict a possible I/O utilization of block storage system 140 in a future period of time after acquiring the historical operation data of block storage system 140. In some embodiments, the I/O utilization is expressed in terms of busyness, for example, a percentage at which the predicted I/O load accounts for the allowed maximum I/O load of block storage system 140.

In some embodiments, in response to determining that the I/O utilization exceeds a predetermined threshold at a certain time in the future, the I/O capability corresponding to the determined I/O utilization is determined based on the determined I/O utilization. As an example, assume that the length of the future time period is 1 day, the first moment is 3 am, and the predetermined threshold is 90%. Then, if the I/O utilization determined by machine learning model 160 at 3:00 am on the first day in the future is 95%, it indicates that the I/O utilization at the first moment exceeds the predetermined threshold. At this time, the I/O capability corresponding to the I/O utilization, i.e., 95%, may be calculated. In some embodiments, the performance of block storage system 140 may be adjusted based on the determined I/O capability.

Figure 8:
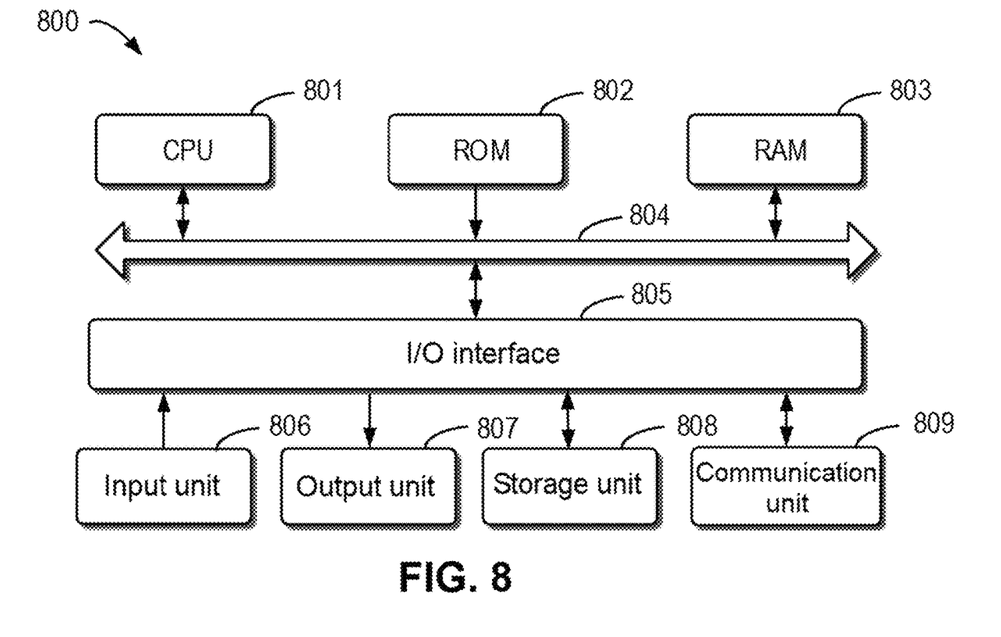
FIG. 8 schematically shows a block diagram of a device for storage performance expansion according to an example implementation of the present disclosure.

FIG. 8 shows a schematic block diagram of device 800 that may be used to implement embodiments of the present disclosure. Device 800 may be the device or apparatus described in the embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus 804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by CPU 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network.

The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for storage performance expansion, comprising:
    acquiring, from a client, a priority of a user and backup settings of the user for backing up data in a storage system;
    determining, based on the priority of the user, an input/output (I/O) specification of the storage system that is to be allocated to the client;
    determining, based on the backup settings, a time period in which a peak value of an I/O load of the storage system occurs; and
    increasing I/O performance of the storage system in response to that the peak value is greater than an upper limit of the I/O specification.

2. The method according to claim 1, further comprising:
    reducing the I/O performance of the storage system based on the backup settings after the time period.

3. The method according to claim 1, wherein the time period is a first time period, the peak value is a first peak value, and the method further comprises:
    acquiring, from the client, restoration settings of the user for restoring data in the storage system;
    determining, based on the restoration settings, a second time period in which a second peak value of the I/O load of the storage system occurs, wherein the first time period is before the second time period;
    determining a time interval between the first time period and the second time period; and
    comparing the first peak value and the second peak value.

4. The method according to claim 3, further comprising:
    improving, in response to that the time interval is less than a threshold and the second peak value is greater than the first peak value, the I/O performance of the storage system based on the second peak value; or
    reducing, in response to that the time interval is less than the threshold and the second peak value is less than the first peak value, the I/O performance of the storage system based on the second peak value.

5. The method according to claim 4, wherein the threshold is a first threshold, and the method further comprises:
determining, in response to that the time interval is greater than the first threshold, a difference between the first peak value and the second peak value; and
reducing the I/O performance of the storage system in response to a determination that the difference is less than a second threshold; or
maintaining the I/O performance of the storage system in response to a determination that the difference is greater than the second threshold and the second peak value is greater than the first peak value.

6. The method according to claim 1, wherein determining, based on the priority of the user, the input/output (I/O) specification of the storage system that is to be allocated to the client comprises:
determining an I/O capability that the storage system is to support;
determining, based on a level of the priority of the user among a plurality of users, each having a respective priority, a proportion of the I/O capability that the user is to be allocated in the storage system; and
determining, based on the proportion, the I/O capability of the storage system that is to be allocated to backup.

7. The method according to claim 1, further comprising:
monitoring the I/O load of the storage system in real time; and
determining a change of the I/O load of the storage system;
and increasing the I/O performance of the storage system in response to that the peak value is greater than the upper limit of the I/O specification comprises:
increasing, in response to that the change exceeds a third threshold, the I/O performance of the storage system based on the I/O specification, the time period, and the change.

8. The method according to claim 7, wherein determining the change of the I/O load of the storage system comprises:
predicting a future I/O load in a future time period based on a trained machine learning model; and
determining the change based on the predicted I/O load in the future time period.

9. The method according to claim 1, wherein determining, based on the backup settings, the time period in which the peak value of the I/O load of the storage system occurs comprises:
determining a start time and an end time of backup based on the backup settings;
predicting an occurrence time of the peak value based on the start time and the end time; and
determining the time period by taking the occurrence time of the peak value as a center.

10. The method according to claim 1, wherein the I/O specification comprises at least one of:
input/output per second (IOPS); or
I/O throughput.

11. An electronic device, comprising:
a processor; and
a memory coupled to the processor, wherein the memory has instructions stored therein which, when executed by the processor, cause the electronic device to perform actions comprising:
acquiring, from a client, a priority of a user and backup settings of the user for backing up data in a storage system;
determining, based on the priority of the user, an input/output (I/O) specification of the storage system that is to be allocated to the client;
determining, based on the backup settings, a time period in which a peak value of an I/O load of the storage system occurs; and
increasing I/O performance of the storage system in response to that the peak value is greater than an upper limit of the I/O specification.

12. The electronic device according to claim 11, wherein the actions further comprise:
reducing the I/O performance of the storage system based on the backup settings after the time period.

13. The electronic device according to claim 11, wherein the time period is a first time period, the peak value is a first peak value, and the actions further comprise:
acquiring, from the client, restoration settings of the user for restoring data in the storage system;
determining, based on the restoration settings, a second time period in which a second peak value of the I/O load of the storage system occurs, wherein the first time period is before the second time period;
determining a time interval between the first time period and the second time period; and
comparing the first peak value and the second peak value.

14. The electronic device according to claim 13, wherein the actions further comprise:
improving, in response to that the time interval is less than a threshold and the second peak value is greater than the first peak value, the I/O performance of the storage system based on the second peak value; or
reducing, in response to that the time interval is less than the threshold and the second peak value is less than the first peak value, the I/O performance of the storage system based on the second peak value.

15. The electronic device according to claim 14, wherein the threshold is a first threshold, and the actions further comprise:
determining, in response to that the time interval is greater than the first threshold, a difference between the first peak value and the second peak value; and
reducing the I/O performance of the storage system in response to a determination that the difference is less than a second threshold; or
maintaining the I/O performance of the storage system in response to a determination that the difference is greater than the second threshold and the second peak value is greater than the first peak value.

16. The electronic device according to claim 11, wherein determining, based on the priority of the user, the input/output (I/O) specification of the storage system that is to be allocated to the client comprises:
determining an I/O capability that the storage system is to support;
determining, based on a level of the priority of the user among a plurality of users, each having a respective priority, a proportion of the I/O capability that the user is to be allocated in the storage system; and
determining, based on the proportion, the I/O capability of the storage system that is to be allocated to backup.

17. The electronic device according to claim 11, wherein the actions further comprise:
monitoring the I/O load of the storage system in real time; and
determining a change of the I/O load of the storage system;

and increasing the I/O performance of the storage system in response to that the peak value is greater than the upper limit of the I/O specification comprises:
increasing, in response to that the change exceeds a third threshold, the I/O performance of the storage system based on the I/O specification, the time period, and the change.

18. The electronic device according to claim 17, wherein determining the change of the I/O load of the storage system comprises:
predicting a future I/O load in a future time period based on a trained machine learning model; and
determining the change based on the predicted I/O load in the future time period.

19. The electronic device according to claim 11, wherein determining, based on the backup settings, the time period in which the peak value of the I/O load of the storage system occurs comprises:
determining a start time and an end time of backup based on the backup settings;
predicting an occurrence time of the peak value based on the start time and the end time; and
determining the time period by taking the occurrence time of the peak value as a center;
and the I/O specification comprises at least one of:
input/output per second (IOPS); or
I/O throughput.

20. A computer program product that is tangibly stored on a computer-readable storage medium and comprises computer-executable instructions, wherein the computer-executable instructions, when executed by a device, cause the device to perform a method, the method comprising:
acquiring, from a client, a priority of a user and backup settings of the user for backing up data in a storage system;
determining, based on the priority of the user, an input/output (I/O) specification of the storage system that is to be allocated to the client;
determining, based on the backup settings, a time period in which a peak value of an I/O load of the storage system occurs; and
increasing I/O performance of the storage system in response to that the peak value is greater than an upper limit of the I/O specification.

* * * * *